Figure 2:
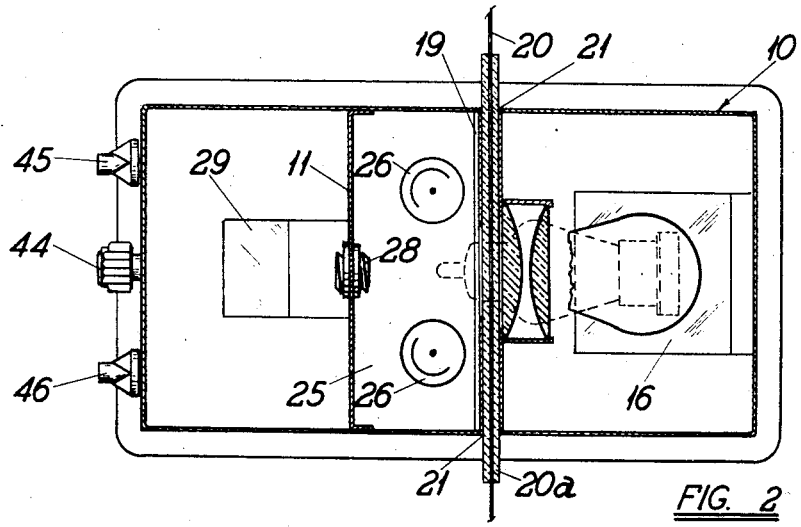

Sept. 2, 1941.  C. W. ADAMS  2,254,878
PHOTOGRAPHIC PRINTER
Filed May 1, 1939   3 Sheets-Sheet 1

INVENTOR.
CURTIS W. ADAMS
BY
ATTORNEYS.

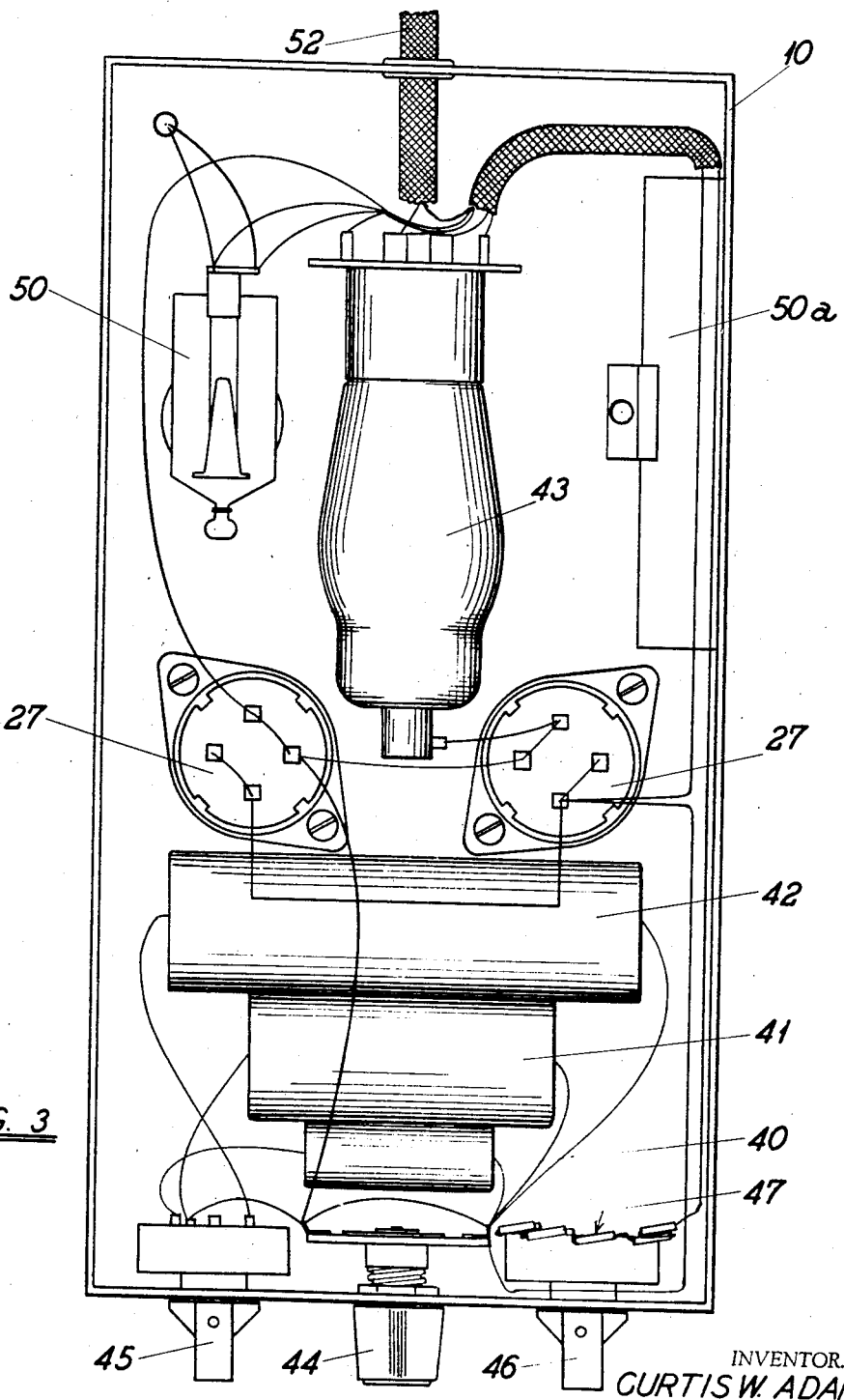

Sept. 2, 1941.    C. W. ADAMS    2,254,878
PHOTOGRAPHIC PRINTER
Filed May 1, 1939    3 Sheets-Sheet 3

INVENTOR.
CURTIS W. ADAMS
BY
ATTORNEY.

Patented Sept. 2, 1941

2,254,878

UNITED STATES PATENT OFFICE 2,254,878

PHOTOGRAPHIC PRINTER

Curtis W. Adams, Ann Arbor, Mich., assignor to International Industries, Inc., Ann Arbor, Mich., a corporation of Michigan Application May 1, 1939, Serial No. 271,055

5 Claims. (Cl. 88—24)

This invention relates to photographic printers or enlargers and more particularly to a device of such character adapted to permit the automatic application of a requisite quantity of light to a given photographic transparency to permit the same to be printed in the most effective manner.

A primary object of this invention is the provision of an attachment for photographic printing appliances which will enable the operator to apply the requisite amount of light to a given photographic transparency in accordance with the particular requirements of such transparency.

An additional object of this invention is the provision of such a device embodying the use of light sensitive cells to govern the application of light to a given transparency for printing, enlarging, or analogous purpose strictly in accordance with the amount of light required by the individual transparency independently of the factor of human judgement.

A still further object resides in the provision of a device of the character described embodying a light sensitive element the sensitivity of which may be varied in accordance with the desire of the operator in order to provide a given intensity of exposure within approximately 100% more or less the normal exposure, to bring out desired special effects in a given negative or transparency.

A specific object is the provision of a plurality of resistance elements in the circuit of the above mentioned light sensitive unit or units, one or more of which may be cut out as desired to achieve the immediately above mentioned effect.

An additional object is the provision of such an appliance embodying means whereby the quantity of light admitted to a given transparency may be governed in accordance with the speed characteristics of the light sensitive emulsion of the photographic paper being printed upon.

Another object lies in the use of a plurality of light sensitive elements (such as photoelectric cells) in order that a complete coverage of the negative or transparency may be had, and in order to provide a relatively large amount of current for control purposes, thus permitting the use of relatively large capacity condensers and thereby reducing to a negligible factor the leakage usually occurring with condensers and associated circuit.

A still further object of this invention is the provision of means contained within the control circuit of the device whereby a single source of electric current supplies all the functioning portions thereof in accordance with their particular requirements, thus eliminating the use of batteries.

Other objects will in part be obvious and in part be pointed out hereinafter.

Figure 1:
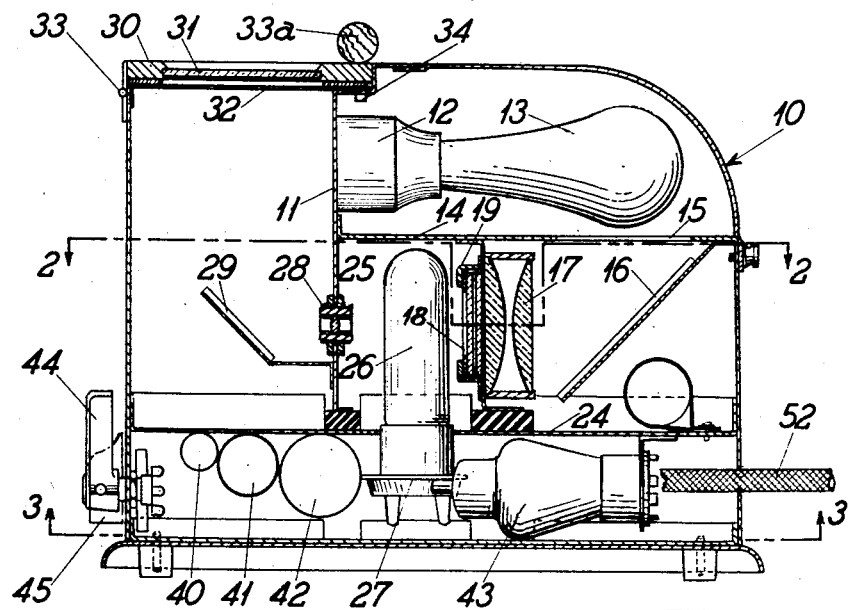
Figure 4:
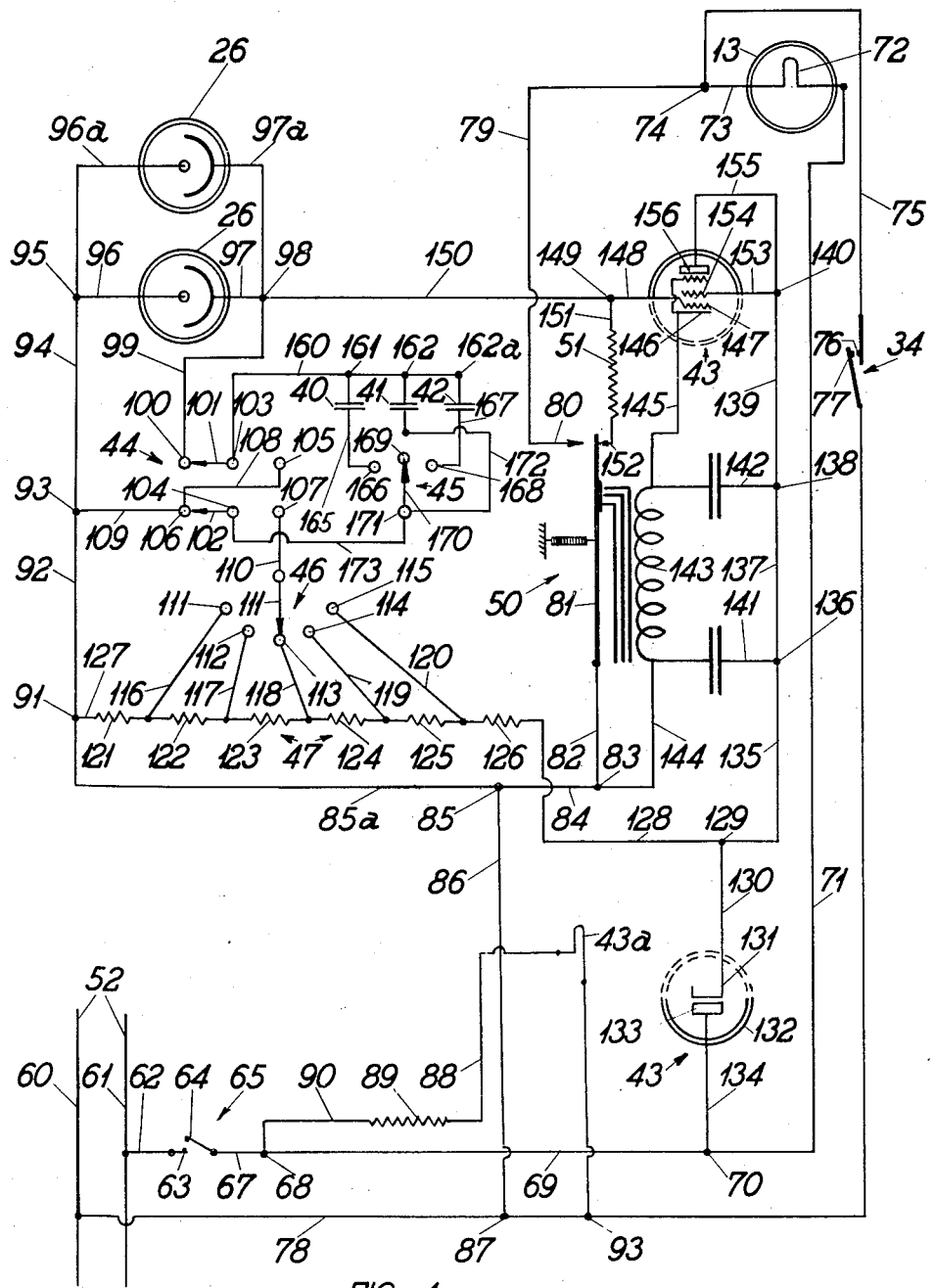

The invention accordingly consists in the combinations of elements, arrangements of parts and features of construction all as will be more fully pointed out hereinafter and disclosed in the accompanying drawings wherein:

Figure 1 is a side sectional view of one form of structure embodying the instant inventive concept, Figure 2 is a sectional view taken substantially along the line 2—2 of Figure 1 as viewed from the top, Figure 3 is an enlarged sectional plan view taken substantially along the line 3—3 of Figure 1 as viewed from the bottom, and Figure 4 is a schematic wiring diagram showing the electrical circuit of the apparatus.

Similar reference characters refer to similar parts throughout the several views of the drawings.

Having particular reference now to Figure 1, there is generally indicated at 10 a casing provided with an interiorly disposed vertical partition 11 to which is secured a socket 12 containing a source of illumination of any desired type as a conventional light bulb 13 of appropriate wattage. A horizontal partition 14 extends below bulb 13 and is provided with an aperture 15 through which light passes to strike a mirror 16 from which it is reflected through a condenser lens system 17 through apertures 18 in a supporting frame 19. Supporting frame 19 is adapted to hold a photographic transparency for enlargement or other suitable purpose. It will be seen that film or other photo transparency 20 is adapted to pass through suitable apertures 21 in the sides of casing 10, extending entirely therethrough, being slidably related to support 19 whereby the photographic transparency may be adjusted horizontally by sliding movement until a desired section thereof is adjacent apertures 18. A suitable frame 20a holds the film flat and permits its ready sliding adjustment through the guiding support 19. Positioned in the chamber 25 formed by partition 11, partition 14 and the partition which supports condenser lenses 17, are a pair of photoelectric cells 26 disposed on opposite sides of the aperture 18. Photoelectric cells 26 are supported in suitable sockets 27 and provided with suitable terminals, to be more fully described hereinafter. A partition 24 extending the complete length of casing 10 and through which sockets 27 project, forms the bottom of chamber 25. Positioned in partition 11 and in alignment with aperture 18, is an objective lens 28 of fixed focus and aperture, through which the light passes from condenser lens 17 to strike a mirror 29, from which it is reflected to a printing frame 30 adapted to contain a photographic paper treated with a sensitized emulsion, it being pointed out that a translucent plate 31 closes the upper portion of the frame and a transparent plate 32 the lower portion of the frame. Any suitable masking means may be provided in connection with the transparency 32.

Plate 31 forming the upper part of frame 30 comprises a part of a lid hinged at 33, which when raised provides a means of ingress and egress for the sensitized photographic paper. A finger piece 33a is provided for ready manipulation of the lid.

Thus it will be seen that when bulb 13 is energized in a manner to be hereinafter pointed out, light passes therefrom through condenser lenses 17, through the photographic transparency to be reproduced in close proximity to photoelectric cells 26, through objective lens 28, and by means of mirror 29 to the photographic paper adapted to receive the reflected image from the film. Thus, energization of light 13 exposes the sensitized paper and causes a reproduction of the photographic transparency thereon in a known manner.

A contact switch 34 is provided on the underside of lid 30 and is adapted to remain in open circuit position when the lid is normally closed but to energize light 13 when pressure is applied to the lid all in a manner and for a purpose to be more fully pointed out hereinafter.

Positioned in the base of casing 30 below partition 24 are a plurality of condensers of varying capacities 40, 41 and 42, and a vacuum tube 43 preferably in the form of a pentode and a diode rectifier contained in a single glass envelope. Projecting from the side wall of the casing are three manually rotatable switches 44, 45 and 46, to the interior of one of which, 46, are secured a plurality of resistance elements 47 forming a resistor network in a manner and for a purpose to be more fully pointed out hereinafter. The casing also contains a relay 50 and a filter condenser 50a (see Figure 3). Power is supplied through a conduit 52 and all the electrical elements hereinbefore mentioned are suitably connected in electrical association by a system of wiring all as will be more fully pointed out hereinafter.

Having reference now to Figure 4, cable 52 will be seen to contain two power lines, a hot line 60 and a cold line 61. From line 61, a wire 62 leads through contacts 63 and 64 of a switch 65, which may be of the snap type adapted totally to de-energize the apparatus, and from which switch a wire 67 leads to a terminal 68. From terminal 68, one wire 69 leads to a terminal 70 from which in turn a wire 71 leads to filament 72 of lamp 13. From the other terminal of filament 72, a wire 73 leads to one contact 76 of switch 34, the other contact 77 of which is connected to a wire 78 which returns to line 60. Thus, assuming switch 65 to be closed the circuit energizing light 13, upon closure of switch 34 will be obvious. Normally it is to be understood that switch 34 is open, however, and light 13 is illuminated in the above manner only for the purpose of temporarily illuminating the viewing plate 31 to permit proper adjustment of the photographic transparency or film 20, with respect to the lens 28 for proper centering.

From terminal 74 a wire 79 leads to one contact 80 of relay 50. The pivoted arm 81 of relay 50 is in electrical contact with a wire 82 which leads to a terminal 83 from which one wire 84 leads to a terminal 85. From terminal 85, one wire 86 leads to the terminal 87 of wire 78. From terminal 68, a wire 90 leads through a resistor 89 and wire 88 to the filament or heater 43a of tube 43, from which a wire 92 leads to a terminal 93 on wire 78.

From terminal 85 a wire 85a leads to terminal 95 from which wires 96 and 96a lead to the cathodes of light sensitive cells 26, of which two are shown. From the anodes of these cells wires 97 and 97a lead to a terminal 98. From terminal 98 a wire 99 leads to terminal 100 of switch 44.

Switch 44, it should here be pointed out, is of the double pole double throw variety and is provided with poles 101 and 102 connected to terminals 103 and 104 respectively. Additional terminals 105, 106 and 107 are adapted to be engaged by poles 101 and 102. Terminals 100 and 106 are connected by a wire 108 and from terminal 106, a wire 109 leads to terminal 93 which is of negative potential. From terminal 107 a wire 110 leads to the pole 111 of switch 46. Pole or arm 111 is adapted selectively to engage one of a plurality of contacts 111, 112, 113, 114, and 115, from which wires 116, 117, 118, 119 and 120 respectively lead to resistance elements 121, 122, 123, 124, 125 and 126 which form the resistor network 47. One end of resistance network 47 is connected by a wire 127 to terminal 91 which is of negative potential. From the other end of the network, a wire 128 leads to a terminal 129 (of positive potential) from which one wire 130 leads to the cathode 131 of the diode or rectifier section 132 of tube 43. From the anode 133 of section 132, a wire 134 leads to terminal 70. A second wire 135 leads from terminal 129 to a terminal 136 from which a wire 137 leads to a terminal 138 and from which in turn a wire 139 leads to a terminal 140. Terminals 136 and 138 are connected respectively to the opposite sides 141 and 142 of relay coil 143, from side 141 of which a wire 144 leads to terminal 83. From the other side, 142, of the coil, a wire 145 leads to cathode 146 of tube 43, from the control grid pentode portion of tube 43, from the control grid 147 of which a wire 148 leads to a terminal 149, from which in turn a wire 150 leads to terminal 98 and a second wire 151 through resistor 51 to contact 152 adapted to be engaged by relay arm 81. A wire 153 leads from terminal 140 to screen grid 154 of tube 43 and a second wire 155 leads from terminal 140 to the plate 156 thereof.

Referring back to terminal 103, it will be seen that a wire 160 leads through terminals 161, 162 and 162a to condensers 40, 41 and 42 respectively. A wire 165 leads from the opposite side of condenser 40 to a switch contact 166 and a wire 167 leads from the opposite side of condenser 42 to a corresponding contact 168. Both of these contacts and a third contact button 169, having no electrical connection, are adapted to be selectively engaged by the switch arm 170 of switch 45 which engages a terminal 171 from which a wire 172 leads to the opposite side of condenser 41 and a second wire 173 leads to terminal 104 of switch 44.

The operation of the device is as follows: Assuming that a negative of average density is to be printed the operator first presses 33a which makes contact with switch 34 illuminating lamp 13 which passes light through the negative and allows the operator to frame the picture properly. Upon viewing the image on the ground glass the operator selects the grade or speed of paper which he desires to use for the print and adjusts switch 45 accordingly.

The operator then turns switch 44 to make contact with terminal 105 and 107, holding the same momentarily in this position for the purpose of charging the previously selected condenser 40, 41 or 42 or any number of them with a potential selected by switch 46. The switch 44 is then released to make contact with terminals 100 and 106. This in turn places the potential of the previously selected condenser so the positive potential is at contact 106. This negative potential is applied to control grid 147 of tube 43 which in turn decreases the current passing through tube 43 and relay coil 143. This decrease in current allows arm 81 to make contact with 80 which is in series with lamp 72, thus lighting said lamp. Light from said lamp passing through transparency falls on photoelectric cells 26. This light causes current to flow and in turn discharges previously selected condenser. When the potential of said condenser is reduced to a point below that required to hold the arm 81 in contact with 80, said arm breaks said contact and extinguishes the lamp. Thus the amount of light which is used for the printing operation is directly controlled by the amount of light passed through the negative transparency.

Switch 46, known as print density control, selects varying amounts of voltage which is used in charging the capacity selected by switch 45, to match the light sensitive emulsion selected by the user. The voltage obtained at contact 111 is a low voltage, thus reducing the time constant of the photo cells and condenser circuit (approximately 50% from normal) when photo cells are exposed to light. When contact is made at 113 with switch 46 the time constant is about normal, thus allowing normal exposure of the light sensitive emulsion or photographic paper used.

When the contact is made at 115 on switch 46, the voltage is considerably higher and thus increases the time constant of photo cell and condenser circuit (approximately 100% of normal).

The reverse of this procedure could be used. That is, varying amounts of voltage for emulsion speed control and varying amounts of capacity for time constant control or print density are possible and practical.

It will be understood, of course, that I do not restrict myself to the particular type and arrangement of parts shown and described. The description and drawings are to be considered as illustrative and not limitative. I consider that the following claims properly define my invention.

I claim:

1. In an apparatus for printing from a photographic transparency onto a photosensitive sheet, a source of light and means for controlling said source of light in accordance with the sensitivity of said sheet and the density of said transparency, said means comprising electromagnetic means for cutting the light from said source off from said transparency, a vacuum tube having a grid for controlling the current passing through said electromagnetic means, a condenser circuit including a condenser, a double pole double throw switch for charging the condenser in said condenser circuit when said switch is in one position and for connecting the negative side of said condenser circuit to the grid of said tube when said switch is reversed, and photosensitive means in the path of light from said source and connected to said condenser circuit for discharging said condenser circuit in accordance with the amount of light falling on said photosensitive means.

2. A photographic printing apparatus comprising a closed housing having top, bottom, side, front and rear walls, a lamp chamber in said housing, a lamp in said chamber, an opaque wall within said housing provided with an aperture, means for supporting a photographic transparency adjacent to and in alignment with said aperture, means for directing light from said source through said aperture, a second opaque wall spaced from and parallel to the first named opaque wall, an objective lens positioned within said second opaque wall in alignment with said aperture and with said transparency at one conjugate focus, light sensitive means positioned between said opaque walls outside the field of said objective lens, means actuated by said light sensitive means for cutting off said lamp when a predetermined amount of light has passed through a transparency positioned at said aperture, and means for positioning a photosensitive sheet in alignment with and at the other conjugate focus of said objective.

3. An apparatus according to claim 1 including means for varying the sensitivity of said photosensitive means in accordance with the sensitivity of said sheet and the density of said transparency.

4. A photographic printing apparatus comprising a closed housing having top, bottom, side, front and rear walls, a lamp chamber within said housing, a lamp in said chamber, an opaque wall within said chamber provided with an aperture, means for supporting a photographic transparency adjacent to and in alignment with said aperture, means for directing light from said source through said aperture, a second opaque wall spaced from and parallel to the first named opaque wall, an objective lens positioned within said second opaque wall in alignment with said aperture and with said transparency at one conjugate focus, light sensitive means positioned between said opaque walls outside the field of said objective lens, means actuated by said light sensitive means for cutting off said lamp when a predetermined amount of light has passed through a transparency positioned at said aperture positioning, means in optical alignment with said objective and at the other conjugate focus thereof for locating a photosensitive sheet, a platen for pressing a photosensitive sheet against said positioning means, and means operable by said platen for controlling said lamp independently of said photosensitive means.

5. An apparatus according to claim 4 including means for varying the sensitivity of said photosensitive means in accordance with the sensitivity of said sheet and the density of said transparency.

CURTIS W. ADAMS.